(12) United States Patent
Cranor

(10) Patent No.: US 7,777,208 B2
(45) Date of Patent: Aug. 17, 2010

(54) INFRA-RED LIGHTING SYSTEM AND DEVICE

(75) Inventor: Earl Cranor, Longmeadow, MA (US)

(73) Assignee: Cyalume Technologies, Inc., West Springfield, MA (US)

( * ) Notice: Subject to any disclaimer, the term of this patent is extended or adjusted under 35 U.S.C. 154(b) by 158 days.

(21) Appl. No.: 12/209,707

(22) Filed: Sep. 12, 2008

(65) Prior Publication Data

US 2009/0072166 A1    Mar. 19, 2009

Related U.S. Application Data

(60) Provisional application No. 60/972,042, filed on Sep. 13, 2007.

(51) Int. Cl.
*C09K 3/00* (2006.01)
(52) U.S. Cl. ............... 250/504 R; 250/493.1; 252/700; 362/34; 372/39; 607/90
(58) Field of Classification Search ............ None
See application file for complete search history.

(56) References Cited

U.S. PATENT DOCUMENTS

| | | | |
|---|---|---|---|
| 3,350,553 A | 10/1967 | Cline | |
| 3,539,794 A | 11/1970 | Rauhut et al. | |
| 3,729,425 A | 4/1973 | Heller et al. | |
| 3,816,325 A | 6/1974 | Rauhut et al. | |
| 3,893,938 A | 7/1975 | Rauhut | |
| 4,578,499 A * | 3/1986 | Imai et al. ............ | 560/21 |
| 4,626,383 A | 12/1986 | Richter et al. | |
| 4,814,949 A * | 3/1989 | Elliott ............ | 362/34 |
| 4,853,327 A * | 8/1989 | Dattagupta ............ | 435/6 |
| 5,121,302 A | 6/1992 | Bay et al. | |
| 5,173,218 A | 12/1992 | Cohen et al. | |
| 5,339,326 A | 8/1994 | Tsujimura et al. | |
| 5,565,570 A * | 10/1996 | Mattingly et al. ............ | 546/108 |
| 5,718,577 A * | 2/1998 | Oxman et al. ............ | 433/37 |
| 5,846,638 A | 12/1998 | Meissner | |
| 5,961,894 A * | 10/1999 | Swetland et al. ............ | 252/700 |
| 6,082,876 A * | 7/2000 | Hanson et al. ............ | 362/293 |
| 6,497,181 B1 * | 12/2002 | Manole et al. ............ | 102/513 |
| 6,963,594 B2 * | 11/2005 | Manico et al. ............ | 372/39 |
| 7,255,691 B2 * | 8/2007 | Tolkoff et al. ............ | 606/9 |
| 7,487,728 B2 * | 2/2009 | Cranor ............ | 102/513 |
| 7,543,534 B1 * | 6/2009 | Manole et al. ............ | 102/513 |

(Continued)

*Primary Examiner*—David A Vanore
(74) *Attorney, Agent, or Firm*—McHale & Slavin, P.A.

(57) ABSTRACT

A chemiluminescent system and device is disclosed wherein a first polymeric sheet having a shaped cavity therein is sealed around its periphery to a second polymeric sheet and the cavity contains a cured PVC plastisol having admixed an oxalate solution and finely divided semiconductor laser crystals and a sealed receptacle containing a liquid component of a chemiluminescent activator. Placed over the plastisol or container is a light filter having a dye or dyes, pigment or pigments compounded into the filter, the dyes or pigments are chosen from those that absorb certain parts of the spectrum such that all light emissions up to 1050 nm are absorbed and anything beyond 1050 nm is transmitted. The devices generate a chemiluminescent light at wavelengths chosen to stimulate the semiconductor laser crystals. The semiconductor laser crystals absorb the chemiluminescent light and re-emit energy at wavelengths in the IR. By choosing the proper light absorbing dyes or pigments in the filter element, the emitted wavelength(s) that the activated device emits can be between 1 micron and 2.5 microns but no visible light.

24 Claims, 4 Drawing Sheets

U.S. PATENT DOCUMENTS

| | | |
|---|---|---|
| 7,628,939 B2 * | 12/2009 | Solsberg ................... 252/700 |
| 7,674,406 B2 * | 3/2010 | Bindra et al. ............... 252/700 |
| 2004/0185392 A1 | 9/2004 | Suzuki et al. |
| 2005/0083676 A1 | 4/2005 | VanderSchuit |
| 2005/0090878 A1 | 4/2005 | Solsberg |
| 2006/0203692 A1 | 9/2006 | Ota et al. |
| 2007/0047216 A1 | 3/2007 | Piazzolla |
| 2008/0308776 A1 * | 12/2008 | Bindra et al. ............... 252/700 |
| 2009/0072166 A1 * | 3/2009 | Cranor .................... 250/504 R |
| 2009/0176313 A1 * | 7/2009 | Suzuki et al. ............... 436/172 |
| 2009/0289237 A1 * | 11/2009 | Cranor ...................... 252/700 |
| 2010/0022023 A1 * | 1/2010 | Cranor et al. ............... 436/172 |
| 2010/0047497 A1 * | 2/2010 | Palmer et al. .............. 428/36.6 |
| 2010/0063567 A1 * | 3/2010 | Solsberg ..................... 607/90 |

* cited by examiner

INFRA-RED LIGHTING SYSTEM AND DEVICE

PRIORITY CLAIM

This application claims the priority date of U.S. Provisional Application Ser. No. 60/972,042 filed Sep. 13, 2007 the contents of which are incorporated herein by reference.

FIELD OF THE INVENTION

This invention is directed toward the field of lighting devices and more particularly, to a lighting system and device that emits Infra-Red "IR" light between 1 micron and 2.5 microns.

BACKGROUND OF THE INVENTION

The term "chemiluminescent reactant", "chemiluminescently reactive" or "chemiluminescent reactant composition" is interpreted to mean a mixture or component thereof which will result in chemiluminescent light production when reacted with other necessary reactants in the processes as disclosed herein.

The term "chemiluminescent composition" is interpreted to mean a mixture which will result in chemiluminescence.

The term "fluidizable solid admixture" is interpreted to mean a non-liquid admixture which behaves as a pseudo fluid when agitated, but has properties of a solid when at rest.

Chemiluminescent light production generally utilizes a two-component system to chemically generate light. Chemiluminescent light is produced by combining the two components, which are usually in the form of chemical solutions referred to as the "oxalate" component and the "activator" component. All suitable oxalate and activator compositions, inclusive of the various additional fluorescers, catalysts and the like, known to be useful in the prior art, are contemplated for use within the present invention.

The two components are kept physically separated prior to activation by a variety of means. Often, a sealed, frangible, glass vial containing one component is housed within an outer flexible container containing the other component. This outer container is sealed to contain both the second component and the filled, frangible vial. Forces created by intimate contact with the internal vial, e.g. by flexing, cause the vial to rupture, thereby releasing the first component, allowing the first and second components to mix and produce light. Since the objective of this type of system is to produce usable light output, the outer vessel is usually composed of a clear or translucent material, such as polyethylene or polypropylene, which permits the light produced by the chemiluminescent system to be transmitted through the vessel walls. These devices may be designed so as to transmit a variety of colors by either the addition of a dye or fluorescent compound to one or both of the chemiluminescent reactant compositions or to the vessel. Furthermore, the device may be modified so as to only transmit light from particularly chosen portions thereof.

Examples of such a chemiluminescent system include U.S. Pat. No. 4,626,383 to Richter et al. discloses chemiluminescent catalysts in a method for producing light in short duration, high intensity systems, and low temperature systems. This invention relates to catalysts for two component chemiluminescent systems wherein one component is a hydrogen peroxide component and the other component is an oxalate ester-fluorescer component. Lithium carboxylic acid salt catalysts, such as lithium salicylate, which lower the activation energy of the reaction and also reduce the temperature dependence of the light emission process are taught.

U.S. Pat. No. 5,121,302 to Bay et al. describes a solid, thin, chemiluminescent device emitting light in one direction. The system is comprised of a back sheet of a laminated metal foil having heat sealed thereto at its edges a bi-component front sheet and a temporary separation means positioned to divide the interior area into two compartments. The bi-component includes a first component of which is a laminated metal foil and a second component of which is a transparent or translucent polyolefin sheet. The metal foil of the bi-component offers heat stability, increased shelf life, and relative impermeability to volatile components of the activator solution. The metal foil laminate for activator solution storage enables the activator solution to retain its viability due to the impermeability of the metal foil.

Additionally, it is desirable to produce chemiluminescent light from objects of various shapes or forms. U.S. Pat. No. 4,814,949 issued to Elliott discloses a means of making shaped, two-dimensional, chemiluminescent objects. Conventional liquid, chemiluminescent reagents are combined to produce light. A non-woven, absorbent article in the desired shape is permitted to absorb the chemiluminescent reagents after mixing and activation so that the article emits light from the shape desired. Although the shape may be as simple or as complex as desired, it is essentially limited to a two-dimensional surface and is additionally limited to producing a single color of light per device.

An example of creating a chemiluminescent system capable of producing light from a swellable polymeric composition is disclosed in U.S. Pat. No. 3,816,325 issued to Rauhut et al. Two primary means are employed to produce solid chemiluminescent systems. The first system relies on diffusion of a chemiluminescent oxalate solution into a solid polymer substrate such as a length of flexible vinyl tubing. The diffusion process occurs when a length of the vinyl tubing is immersed in a suitable chemiluminescent reagent for an extended period of time. After removal of the tubing from the oxalate solution, application of liquid activator to the surface of the tubing causes the tubing to emit light. Since the solid polymer is relatively non-porous, it is difficult to rapidly and completely activate the oxalate in the tubing because the relatively slow process of diffusion must also be relied upon to permit the activator solution to reach the chemiluminescent reagent diffused into the polymer before light can be generated.

In a further embodiment of U.S. Pat. No. 3,816,325, the chemiluminescent oxalate solution is mixed with a polyvinyl chloride (PVC) resin powder to form a paste, which is then spread on a substrate and baked in an oven to form a flexible, elastic film. While this embodiment is operative, the polyvinyl chloride sheet described exhibits weaknesses in uniformity, strength, flexibility, and most importantly, porosity. Additionally, the processes described are primarily suitable for producing relatively thin objects only.

U.S. Pat. No. 5,173,218 to Cohen et al. discloses a combination of PVC polymer resins to produce a porous, flexible, chemiluminescent structure from liquid slurries. Thus, while the production of devices capable of emitting light through chemical means is well known in the art e.g. chemiluminescent lightsticks, for example, are taught by U.S. Pat. No. 3,539,794 and other configurations of devices for emitting chemical light have also been the subject of many U.S. patents, see, for example U.S. Pat. Nos. 3,350,553; 3,729,425 and 3,893,938.

Thus, what is lacking in the art is a means for producing IR light by means of chemiluminescence, and producing a porous composition to exhibit quick activation and excellent light output.

SUMMARY OF THE INVENTION

Disclosed is a chemiluminescent system that emits IR light between 1 micron and 2.5 microns. The system is based upon a PVC plastisol formed by admixing a chemiluminescent oxalate solution as the plasticizer. Mixed into the plastisol are finely divided semiconductor crystals (example Nd:YAG or other lathanide based crystals as are known for use in semiconductor lasers). The color of the oxalate solution used as the plasticizer is chosen so that it is at or near an absorption band for the chosen semiconductor laser crystal. The PVC plastisol is cast in a pad that can be shaped into any type of configuration. Placed over the plastisol is a light filter having a dye or dyes, pigment or pigments or combinations thereof compounded into the filter, the dyes and-or pigments are chosen from dyes or pigments that absorb certain parts of the spectrum such that all light emissions up to 1050 nm are absorbed and anything beyond 1050 nm is transmitted. The exact light absorbing properties of the dyes or pigments are chosen to minimize emission of light from the excitation source. The device is made operational by placing an activator over the oxalate admixed plastisol which generates a chemiluminescent light. This chemiluminescent light stimulates the semiconductor laser crystals, whereupon the crystals fluoresce.

The semiconductor laser crystals are excited by the chemiluminescent light and re-emit energy at wavelengths in the IR, including between 1 micron and 2.5 microns. By choosing the proper absorbing dyes in the filter element, the emitted wavelength(s) that the activated device emits can be controlled to desired wavelengths in the IR with little or no undesirable visible or other light output.

An objective of this invention is to disclose the use of a chemiluminescent device that emits IR light between 1 micron and 2.5 microns.

Another objective of this invention is to disclose the use of a chemiluminescent device that emits IR light based upon a PVC plastisol that is formed in combination with a chemiluminescent oxalate solution as the plasticizer and semiconductor laser crystals.

Another objective of this invention is to disclose the use of a chemiluminescent light to stimulate semiconductor laser crystals, wherein the semiconductor laser crystals absorb the chemiluminescent light and re-emit energy at longer wavelengths.

Still another objective of this invention is to disclose the use of a filter lens placed over stimulated semiconductor laser crystals capable of filtering out undesirable light yet passing desirable IR light of a predicable wavelength.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE INVENTION

The instant invention is an infrared light emitting chemiluminescent system comprising an oxalate component including, in combination, a plastisol formed by admixture of a polyvinylchloride resin component and an oxalate plasticizer component; an infrared fluorescer including semiconductor laser crystals which absorb chemiluminescent light and reemit infrared energy at wavelengths within the range of about 1 micron to about 2.5 microns; and an activator component effective for generating chemiluminescent light when contacted with an oxalate component; wherein combining said oxalate component, said infrared fluorescer and said activator component results in the excitation of said fluorescer whereby said fluorescer emits an infrared light within the range of about 1 micron to about 2.5 microns.

Figure 1:
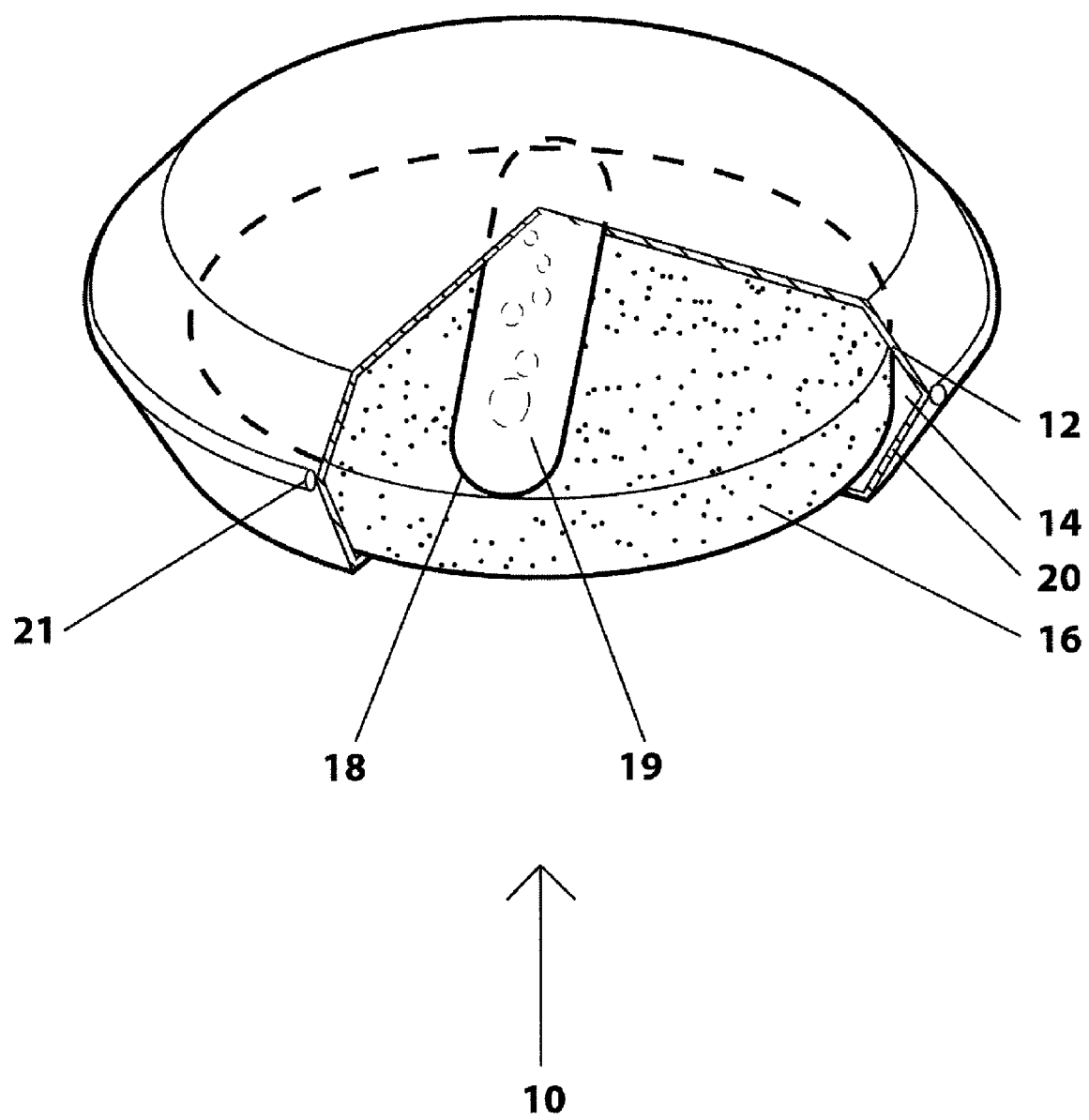
FIG. 1 is a cut-away isometric view of the Infra-Red Lighting Device containing a single ampoule.

Now, referring to FIG. 1, disclosed is a chemiluminescent device 10 comprising a visible light filter 12 formed from a first polymeric sheet of approximately 0.01-0.5 inch thickness being translucent or transparent and having a shaped cavity 14 therein, said cavity capable of receiving a liquid; a PVC plastisol 16 having a red oxalate solution, or other color as may be desired, the plastisol is intermixed with Nd:YAG crystals, said plastisol being of substantially the same shape as said cavity; a sealed, breakable receptacle 18 containing a quantity of a liquid component, 19 of a chemiluminescent light composition capable of providing chemiluminescent light when contacted with said plastisol; and a second polymeric sheet 20 of approximately 0.02-0.06 inch thickness, sealed around its periphery 21 to the periphery of said first polymeric sheet; the quantity of liquid being such that when absorbed on the plastisol, the plastisol is substantially completely saturated; whereby activation of said device occurs upon the fluid component release thereby coating said plastisol and stimulating the Nd:YAG crystals wherein said Nd:YAG absorbs the red or other appropriate light and reemits energy at wavelengths in the IR range, said first polymeric sheet used for filtering said wavelengths. Optionally, the first polymeric sheet is polycarbonate that is placed over or laminated to polyethylene wherein the polycarbonate operates as a visible light filter and the polyethylene operates to contain the activator. The polycarbonate includes at least one dye, pigment or combination of dyes and/or pigments chosen from a group of dyes or pigments that absorb certain parts of the visible spectrum such that substantially all light emissions up to 1050 nm are absorbed and anything beyond 1050 nm is transmitted.

The receptacle is preferably in the form of a glass ampoule or a flexible sealed pouch. The first and second polymeric sheets are sonically, vibrationally, thermally or otherwise sealed together about their peripheries. Considering the elements of the device of the instant invention in the sequence presented above, the first polymeric sheet is flexible, transparent or translucent and chemically inert. It has a shape retaining memory and toughness which resists bursting from internal or external pressure and discourages puncture. It is produced from a polyolefin, preferably polyethylene, polypropylene, or copolymers thereof and can range from about 0.01 to about 0.05 inch in thickness, preferably from about 0.02 to about 0.04 inch. A circumferentially raised rib may be incorporated into its exterior face around the periphery of the shaped cavity to help prevent accidental activation of the device. The sheet may be either injection molded or thermoformed. The cavity can be in any desired shape such as a geometric shape, i.e., square, rectangle, circle, cross, etc., or an arrow, letter, number, etc. Indicia may be printed or otherwise imparted to either surface of the first polymeric sheet. Additionally, a pressure-sensitive adhesive or other adhesive may be applied to at least a portion of the exterior of the device so that it may be conveniently attached to surfaces. The polymeric sheet operates as a visible light filter being translucent or transparent and having a shaped cavity therein, said cavity capable of receiving a liquid. The polymeric sheet includes at least one dye, pigment or a combination thereof. The dyes or pigments are chosen from a group of dyes or pigments that absorb certain parts of the visible spectrum such that substantially all light emissions up to 1050 nm are absorbed and anything beyond 1050 nm is transmitted.

Figure 3:
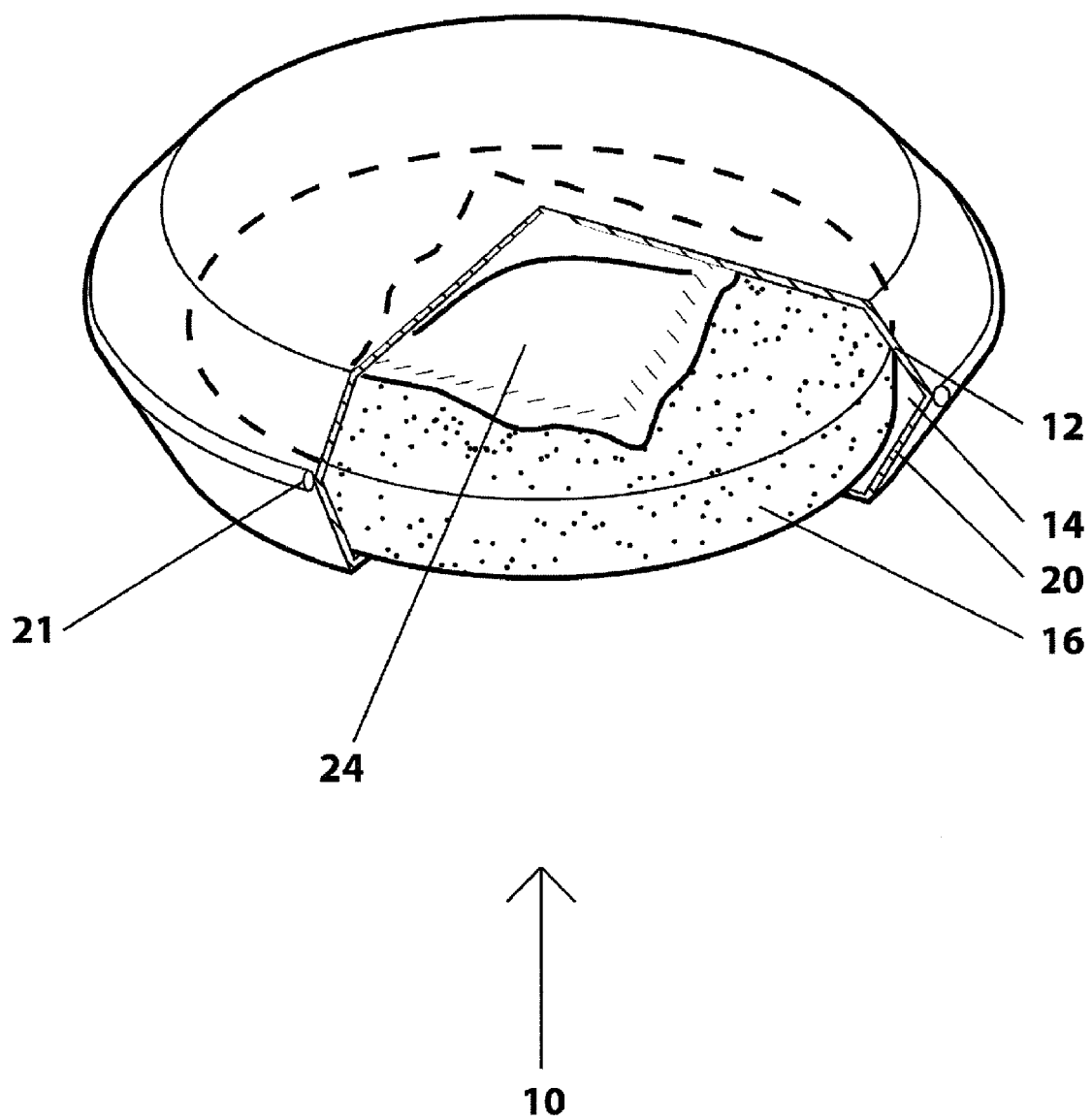
FIG. 3 is a cut-away isometric view of the Infra-Red Lighting Device containing a rupturable pouch.

The first sealed, breakable or rupturable receptacle 18 contains the liquid component of the chemiluminescent light composition. The receptacle is preferably composed of glass, i.e., may comprise a glass ampoule, however, the receptacle may also constitute a pouch 24 that can be ruptured as is illustrated in FIG. 3. The main function of the receptacle is to segregate the chemiluminescent liquid contents therein from the second chemiluminescent component, however, protection of the contained component from moisture, oxygen etc., and/or actinic light is also a favorable effect thereof. A preferred pouch is made from a heat-sealable polyethylene/foil/polypropylene/polyethylene film laminate. It is chemically inert and provides a light and moisture barrier. The activator portion of the chemiluminescent light composition is usually packaged in such a pouch. The receptacle is sized to fit the device above the liquid-absorbing article in close proximity to the cavity and holds the volume of liquid which the plastisol must be coated with to create the light. The fluid component usually comprises the peroxide portion of the chemiluminescent composition, referred to as the activator. In preparing the liquid filled receptacle, nitrogen gas, argon gas, etc. may be used to flush the receptacle to displace oxygen, water vapor or other contaminants which may be trapped therein. In the case of the plastic pouch receptacle, the gas etc., causes the pouch to assume a pillow shape and thereby assists in rupturing the pouch when activating the device. The breakage of the ampoules or rupture of the pouch in the cavity, which should be chemically inert, allows even coating of the plastisol, thereby assuring uniformity of light emission.

In an embodiment of the invention, a chemiluminescent system that emits infra-red light comprising a housing including a cavity formed therein. The housing has at least one surface formed from a polymeric material capable of allowing light to pass therethrough. An oxalate component including, in combination, a plastisol placed within the cavity and a an infrared fluorescer formed from semiconductor crystals is placed within the cavity or within the polymeric material. A sealed, breakable receptacle is placed within the cavity, the receptacle containing a quantity of an activator component of a chemiluminescent light composition capable of providing chemiluminescent light when mixed with the oxalate component. The breakage of the receptacle mixes the oxalate component and the activator component to create a chemiluminescent light having a wavelength that excites the semiconductor crystals which re-emit infrared light.

The second, polymeric sheet may be prepared from the same material as the first sheet and is usually slightly thicker, ranging in thickness from about 0.02 to 0.06 inch. It also is chemically inert, flexible and puncture resistant. A suitable material from which both the first and second polymeric sheets are preferably prepared is a propylene copolymer. The second sheet may be die cut, injection molded or thermoformed and it may contain a molded step inside its periphery to reduce bulging of the device caused by pressures resulting from the chemical reaction of the components once activation is effected. The peripheries of the first and second polymeric sheets are sealed together to form a non-rupturable bond by bar heating, ultrasonic sealing, vibrational welding, laser welding and so forth as may be desired.

Figure 2:
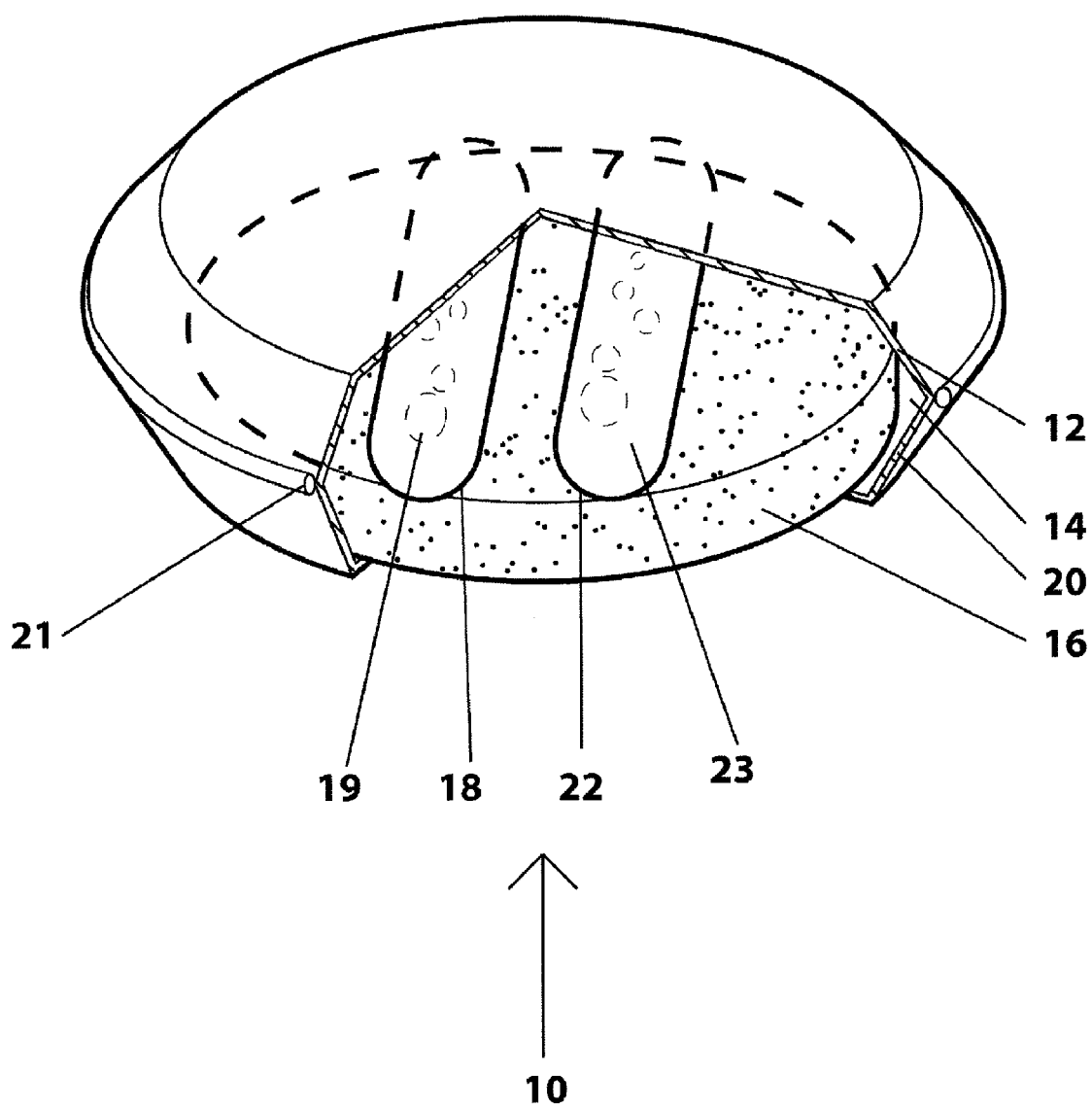
FIG. 2 is a cut-away isometric view of the Infra-Red Lighting Device containing multiple ampoules.

The formable, porous, chemiluminescent reactant composition can be made by swelling and/or dissolving PVC resin with a chemiluminescent reactant solution which is exemplified herein as an oxalate solution. By further adding finely divided ND:YAG crystals or the like, the resultant material is a pourable, liquid slurry which will produce infrared light upon activation. A similar slurry may also be prepared in which the oxalate component is held back in a separate container and an oxalate-free solvent (containing a fluorescer) is used to swell or otherwise dissolve the PVC resin which is then cured into a pad. In such case, the activator and oxalate portions of the reaction are housed separately (refer to FIG. 2), for example in glass receptacles 18 and 22 and introduced to the resultant pad substantially simultaneously to begin the production of light. In either case, the slurry is cured into a flexible, porous pad by heating in an oven. While the preferred embodiment includes neodymium-doped yttrium aluminum garnet Nd:YAG (Nd:$Y_3Al_5O_{12}$) other common neodymium-doped gain media include Nd:YLF (Nd:$YLiF_4$) (yttriumlithium fluoride), Nd:glass, Nd:$GdVO_4$ (gadolinium vanadate), Nd:GDD (gadolinium gallium garnet), Nd:KGW (Nd:KGd $(WO_4)_2$), Nd:KYW (Nd:KY$(WO_4)_2$), Nd:YALO (Nd:$YAlO_3$), Nd:YAP (Nd:$YAlO_3$), Nd:LSB (Nd:$LaSc_3(BO_3)_4$, Nd:S-FAP (Nd:$Sr_5(PO_4)_3F$); Er:YAG Erbium-doped YAG; Yb:YAG Ytterbium-doped YAG; Ho:Cr:Tm:YAG Holmium-chromium-thulium triple-doped YAG (Ho:Cr:Tm:YAG, or Ho, Cr,Tm:YAG).

A properly cured sample is defined as one in which all of the solvent solution, whether containing oxalate or not, has been absorbed into the PVC matrix, and which does not exhibit signs of over-curing. In a properly cured matrix, the lower molecular weight PVC particles fuse together. However, the higher molecular weight PVC particles, while absorbing the liquid solvent solution, do not significantly fuse together thereby resulting in a porous matrix. If the curing time and temperature is excessive, the higher molecular weight PVC particles will fuse together, resulting in a matrix which is over-cured as evidenced by the presence of dark and/or shiny regions within the cured sample, referred to as a pad. This over-cured matrix will exhibit very low porosity and hence, reduced light output.

A model which explains the formation of interstitial spaces in PVC particle/solvent slurries is that in which large, roughly spherical, PVC particles are joined together by smaller, lower molecular weight, PVC particles to form a matrix trapping the Nd:YAG crystals. The PVC particles absorb the solvent that had initially filled the interstitial spaces between these particles. If air or other gas is permitted to enter the matrix during this curing process, the PVC particles will swell and expand as the solvent is absorbed into the particles and produce the desirable porous matrix. A large variety of polymers may be employed in the polymeric composition: poly(vinyl Chloride), Poly(methyl methacrylate), poly(vinyl benzoate), poly (vinyl acetate), cellulose poly(vinyl pyrrolidone), polyacrylamide, polyurethane, nylons, poly acetyl, polycarbonate, polyesters and polyethers are non-limiting examples. Crosslinked polymers may also be employed, such as polystyrene-poly(divinyl benzene), polyacrylamide poly(methylenebisacrylamide), polybutadiene-copolymers, and the like. For most applications the polymer should be selected in conjunction with the activating hydrogen peroxide containing liquid so as to be dissolvable, swellable, or otherwise permeable to said activating liquid. Such permeability is normally desired to permit efficient contact between the activating liquid, the chemiluminescent material, and the red (or other color) fluorescer. The permeability of polymers to solvents is, of course, well known to the art and it is a straightforward matter to select useful polymer/solvent combinations. Solvents used as plasticizers are particularly advantageous.

It is not necessary for either the chemiluminescent material or the fluorescer to be soluble in the polymer itself, although where the polymer does not itself provide solubility for both these ingredients, the activating liquid should provide at least partial solubility. Alternatively the polymer could be plasticized with a solubilizing plasticizer.

Figure 4:
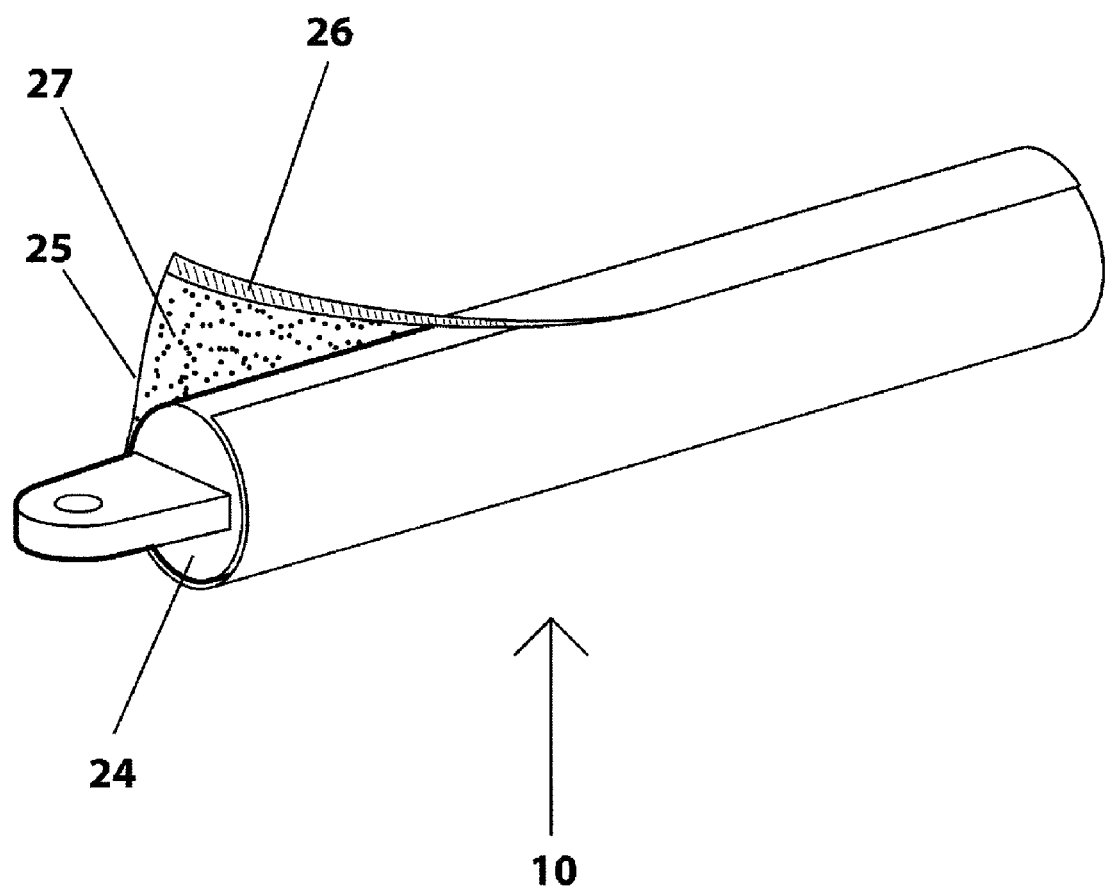
FIG. 4 is a peeled-away view showing an infrared emitting film applied to a lightstick.

So as to illustrate the versatility of the invention, set forth an alternative embodiment wherein the shape of structure is that of a conventional lightstick in which two or more chemiluminescently reactive components are kept physically separated prior to activation by a variety of means. A sealed, frangible, glass vial containing on component is housed within an outer flexible, optically transparent container containing the other component. This outer container is sealed to contain both the second component and the filled, frangible vial. Forces created by intimate contact with the internal vial, e.g. by flexing, cause the vial to rupture, thereby releasing the first component, allowing the first and second components to mix and product light. As in previously disclosed embodiments, light from this chemiluminescent reaction then serves as the excitation source for finely divided laser crystals which convert the chemiluminescent light to mid-infrared light. Referring to FIG. 4, a preferred form comprises a lightstick 24 with light emission of the specified wavelength which is at least partially sleeved with an energy converting film 25. This film may be in the form of a wrapper such as a thin sheet of plastic, preferably about 0.0005 inches to about 0.020 inches thick. Alternately, the film may be created on the outer surface of the lightstick by dipping, spraying or otherwise coating the lightstick. In either case, the film comprises a layer or other distribution of laser crystals 27 which are excited by the light produced by the chemiluminescent reaction thereby causing the crystals to emit mid-infrared energy. As before, an optical filter comprised of at least one dye, pigment or combination thereof blocks undesirable light and passes desirable mid-infrared light. This filter is most readily incorporated into a wrapper as a second layer on the opposite side of the film as to that which the crystals are incorporated, but the filter may also be distributed throughout the thickness of the film if the laser crystals are positioned between the filter and the lightstick. If the film is in the form of a wrapper, an adhesive may be employed to secure it to the lightstick. A convenient means of achieving this is to provide a wrapper which is coated with an adhesive layer on one side. The finely divided laser crystals are secured to the film by use of this adhesive layer. An additional protective layer may be employed on top of the crystals to further secure the crystals and protect them from damage. This layer can take the form of an acrylic resin or other suitable material which may be applied by spraying or other processes. A region 26 along the periphery of the film is left uncoated by the crystals. The exposed adhesive in this region is then used to secure the film to the lightstick.

Although PVC is the preferred polymeric resin, the polymeric composition is not limited thereto.

Various methods for shaping and/or processing are applicable to the chemiluminescent reactant composition of the present invention. Examples of such methods include, but are not limited to, injection molding, extrusion, compression molding, cast molding, powder molding, or electrostatic deposition, such as xerography and screen printing. Powder molding comprises dry blending the moist powder and a curable additive to form a moldable composition.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An infrared light emitting chemiluminescent system comprising:
    an oxalate component including, in combination, a plastisol formed by admixture of a polyvinylchloride resin component and an oxalate plasticizer component;
    an infrared fluorescer including semiconductor laser crystals which absorb chemiluminescent light and reemit infrared energy at wavelengths within the range of about 1 micron to about 2.5 microns; and
    an activator component effective for generating chemiluminescent light when contacted with an oxalate component;
    wherein combining said oxalate component, said infrared fluorescer and said activator component results in the excitation of said fluorescer whereby said fluorescer emits an infrared light within the range of about 1 micron to about 2.5 microns.

2. The infrared light emitting chemiluminescent system of claim 1, wherein said oxalate component further includes a coloration component which is at or near an absorption band of said semiconductor laser crystal.

3. The infrared light emitting chemiluminescent system of claim 1 wherein the oxalate component is formable into a desired shape.

4. The infrared light emitting chemiluminescent system of claim 1 wherein said fluorescer is a neodymium doped semiconductor laser crystal selected from the group consisting of Nd:YAG (Nd:$Y_3Al_5O_{12}$), Nd:YLF (Nd:$YLiF_4$) (yttrium lithium fluoride), Nd:glass, Nd:$GdVO_4$ (gadolinium vanadate), Nd:GDD (gadolinium gallium garnet), Nd:KGW (Nd:KGd($WO_4$)$_2$), Nd:KYW (Nd:KY($WO_4$)$_2$), Nd:YALO (Nd:$YAlO_3$), Nd:YAP (Nd:$YAlO_3$), Nd:LSB (Nd:$LaSc_3(BO_3)_4$, Nd:S-FAP (Nd:$Sr_5(PO_4)_3F$); Er:YAG Erbium-doped YAG;

Yb:YAG Ytterbium-doped YAG; Ho:Cr:Tm:YAG Holmium-chromium-thulium triple-doped YAG (Ho:Cr:Tm:YAG, or Ho, Cr,Tm:YAG).

5. The infrared light emitting chemiluminescent system of claim 1 wherein said fluorescer is neodymium-doped yttrium aluminum garnet (Nd:YAG, $Nd:Y_3Al_5O_{12}$) semiconductor laser crystals.

6. The infrared light emitting chemiluminescent system of claim 1, further including a light filtering component being constructed and arranged to absorb light emissions up to about 1050 nm and transmit light emissions above 1050 nm.

7. The infrared light emitting chemiluminescent system of claim 6 wherein said light filtering component is a polycarbonate sheet containing at least one dye effective for absorbing light emissions up to about 1050 nm and transmitting light emissions above 1050 nm.

8. A chemiluminescent system that emits infra-red light comprising:
a housing including a cavity formed therein, said housing having at least one surface formed from a polymeric material capable of allowing light to pass therethrough;
an oxalate component placed within said cavity;
an infrared fluorescer formed from semiconductor crystals placed within said cavity;
a sealed, breakable receptacle placed within said cavity, said receptacle containing a quantity of an activator component of a chemiluminescent light composition capable of providing chemiluminescent light when mixed with said oxalate component;
wherein the breakage of said receptacle mixes said oxalate component and said activator component to create a chemiluminescent light having a wavelength that excites said semiconductor crystals which re-emit infrared light.

9. The chemiluminescent system according to claim 8 including a filter lens being constructed and arranged to absorb light emissions up to about 1050 nm and transmit light emissions above 1050 nm.

10. The chemiluminescent system according to claim 8 wherein said infra-red light is at a wavelength between 1 micron and 2.5 microns.

11. The chemiluminescent system according to claim 8 wherein said polymeric material is between 0.01-0.5 inches thick.

12. The chemiluminescent system according to claim 11 wherein said polymeric sheet is constructed from polycarbonate having at least one dye or pigment capable of absorbing visible light.

13. The chemiluminescent system according to claim 12 wherein said polycarbonate is laminated to a polyethylene.

14. The chemiluminescent system according to claim 8 wherein said semiconductor crystals are neodymium doped semiconductor laser crystal selected from the group consisting of Nd:YAG ($Nd:Y_3Al_5O_{12}$), Nd:YLF ($Nd:YLiF_4$) (yttrium lithium fluoride), Nd:glass, $Nd:GdVO_4$ (gadolinium vanadate), Nd:GDD (gadolinium gallium garnet), Nd:KGW ($Nd:KGd(WO_4)_2$), Nd:KYW ($Nd:KY(WO_4)_2$), Nd:YALO ($Nd:YAlO_3$), Nd:YAP ($Nd:YAlO_3$), Nd:LSB ($Nd:LaSc_3(BO_3)_4$), Nd:S-FAP ($Nd:Sr_5(PO_4)_3F$); Er:YAG Erbium-doped YAG; Yb:YAG Ytterbium-doped YAG; Ho:Cr:Tm:YAG Holmium-chromium-thulium triple-doped YAG (Ho:Cr:Tm:YAG, or Ho, Cr,Tm:YAG).

15. The infrared light emitting chemiluminescent system of claim 8 wherein said semiconductor crystals are neodymium-doped yttrium aluminum garnet (Nd:YAG, $Nd:Y_3Al_5O_{12}$) semiconductor laser crystals.

16. The chemiluminescent system according to claim 8 wherein said oxalate is admixed with a plastisol.

17. The chemiluminescent system according to claim 16 wherein said semiconductor crystals are admixed with said plastisol.

18. The chemiluminescent system according to claim 17 wherein said exposed side surface includes indicia.

19. The chemiluminescent system according to claim 17 wherein said housing is secured to a fixed surface by adhesive.

20. The chemiluminescent system according to claim 8 wherein said housing is a geometric shape wherein a side surface is formed from said polymeric sheet allowing the passage of light therethrough.

21. The chemiluminescent system according to claim 8 wherein said housing is shaped to emit light from a continuous side surface, said housing resembles a conventional light stick.

22. The chemiluminescent system according to claim 8 wherein said breakable receptacle is a glass ampoule.

23. The chemiluminescent system according to claim 8 wherein said breakable receptacle is a flexible pouch.

24. The chemiluminescent system according to claim 8 wherein said infrared fluorescer is incorporated into said polymeric sheet of said housing.

* * * * *